United States Patent
Ahn et al.

(10) Patent No.: US 9,231,967 B2
(45) Date of Patent: Jan. 5, 2016

(54) APPARATUS AND METHOD FOR DETECTING IN-VEHICLE NETWORK ATTACK

(71) Applicants: Hyundai Motor Company, Seoul (KR); SNU R&DB FOUNDATION, Seoul (KR); Industry-Academic Cooperation Foundation, Chosun University, Gwangju (KR)

(72) Inventors: Hyun Soo Ahn, Yongin-si (KR); Chung Hi Lee, Seoul (KR); Byoung Wook Lee, Seoul (KR); Hyun Cheol Bae, Suwon-si (KR); Jong Seon No, Seoul (KR); Ji Youp Kim, Seoul (KR); Jun Young Woo, Seoul (KR); Chang Min Cho, Seoul (KR); Young Sik Kim, Gwangju (KR); Young Sik Moon, Seoul (KR)

(73) Assignees: HYUNDAI MOTOR COMPANY, Seoul (KR); SNU R&DB FOUNDATION, Seoul (KR); INDUSTRY-ACADEMIC COOPERATION FOUNDATION, CHOSAUN UNIVERSITY, Dong-Gu, Gwangju (KR)

( * ) Notice: Subject to any disclaimer, the term of this patent is extended or adjusted under 35 U.S.C. 154(b) by 151 days.

(21) Appl. No.: 13/919,940

(22) Filed: Jun. 17, 2013

(65) Prior Publication Data

US 2014/0165191 A1 Jun. 12, 2014

(30) Foreign Application Priority Data

Dec. 12, 2012 (KR) ........................ 10-2012-0144900

(51) Int. Cl.
*G06F 11/00* (2006.01)
*H04L 29/06* (2006.01)
*H04L 29/08* (2006.01)

(52) U.S. Cl.
CPC ............ *H04L 63/1425* (2013.01); *H04L 67/12* (2013.01)

(58) Field of Classification Search
CPC .......... H04L 9/002; H04L 63/14; G06F 21/50
USPC ........... 726/22–23; 713/163–165; 370/395.32
See application file for complete search history.

(56) References Cited

U.S. PATENT DOCUMENTS

| 5,025,457 A * | 6/1991 | Ahmed .......................... 375/354 |
| 6,175,874 B1 * | 1/2001 | Imai et al. ..................... 709/238 |

(Continued)

FOREIGN PATENT DOCUMENTS

| JP | 2007-104307 A | 4/2007 |
| KR | 10-2000-0072707 A | 12/2000 |

(Continued)

OTHER PUBLICATIONS

Maxim Raya, Security of Vehicular Ad Hoc Networks, Apr. 2005, ACM, vol. 10, pp. 11-21.*

*Primary Examiner* — Dede Zecher
*Assistant Examiner* — Viral Lakhia
(74) *Attorney, Agent, or Firm* — McDermott Will & Emery LLP

(57) ABSTRACT

An apparatus for detecting an in-vehicle network attack, is configured to cumulatively count packets for each device that has a respective ID and is connected to an in-vehicle network bus. The apparatus is configured to cumulate a check value every time the packets are cumulatively counted to calculate a cumulated value, and determine that an attack is conducted when an average cumulated value obtained by dividing the cumulated value by a cumulative counted value does not exceed a first threshold value.

10 Claims, 4 Drawing Sheets

(56) References Cited

U.S. PATENT DOCUMENTS

| | | | |
|---|---|---|---|
| 7,203,961 B1* | 4/2007 | Dalal et al. | 726/22 |
| 7,251,215 B1* | 7/2007 | Turner | H04L 12/4633 370/231 |
| 7,529,242 B1* | 5/2009 | Lyle | H04L 45/00 370/392 |
| 7,743,419 B1* | 6/2010 | Mashevsky et al. | 726/24 |
| 7,809,131 B1* | 10/2010 | Njemanze et al. | 380/2 |
| 8,015,604 B1* | 9/2011 | Tidwell et al. | 726/22 |
| 8,078,390 B2* | 12/2011 | Menzel et al. | 701/117 |
| 8,266,696 B2* | 9/2012 | O'Rourke et al. | 726/23 |
| 8,316,237 B1* | 11/2012 | Felsher | H04L 9/0825 380/282 |
| 8,452,644 B2* | 5/2013 | Povolny | G07B 15/063 340/902 |
| 8,453,208 B2* | 5/2013 | Jiang | H04L 63/08 709/229 |
| 8,806,632 B2* | 8/2014 | Stefanidakis et al. | 726/23 |
| 9,027,129 B1* | 5/2015 | Kancherla | H04L 63/1458 726/22 |
| 2002/0150866 A1* | 10/2002 | Perry | F41G 7/006 434/62 |
| 2005/0144309 A1* | 6/2005 | Gish | H04L 47/10 709/233 |
| 2006/0026682 A1* | 2/2006 | Zakas | 726/22 |
| 2011/0085443 A1* | 4/2011 | Shikano | 370/235 |
| 2011/0167147 A1* | 7/2011 | Andersson | H04L 12/5695 709/224 |
| 2011/0170532 A1* | 7/2011 | Tchepnda | H04W 12/06 370/338 |
| 2011/0213869 A1* | 9/2011 | Korsunsky et al. | 709/223 |
| 2013/0279392 A1* | 10/2013 | Rubin et al. | 370/312 |
| 2013/0279695 A1* | 10/2013 | Rubin et al. | 380/255 |

FOREIGN PATENT DOCUMENTS

| | | |
|---|---|---|
| KR | 10-0424724 | 3/2004 |
| KR | 10-0732854 B1 | 6/2007 |
| KR | 10-2010-0041533 A | 4/2010 |
| KR | 10-2012-0078191 A | 7/2012 |

* cited by examiner

APPARATUS AND METHOD FOR DETECTING IN-VEHICLE NETWORK ATTACK

CROSS-REFERENCE TO RELATED APPLICATION

This application is based on and claims benefit of priority to Korean Patent Application No. 10-2012-0144900, filed on Dec. 12, 2012 in the Korean Intellectual Property Office, the entire contents of which are hereby incorporated by reference.

TECHNICAL FIELD

The present inventive concept relates to an apparatus and a method for detecting an in-vehicle network attack, and more particularly, to an apparatus and a method of detecting external arbitrary attacks against an in-vehicle network ahead of time.

BACKGROUND

In general, since an in-vehicle network is operated independent of an external network, there is no equipment for protecting in-vehicle network information.

Recently, since the in-vehicle network may be connected to external networks, such as a wireless communication network (3G/4G), Bluetooth, and the like and connected to a vehicle diagnosis device, it is likely that an in-vehicle network is negatively affected. That is, when a malicious attacker of external networks disturbs an internal network, a serious problem occurs in a vehicle operation, which may threaten safety of passengers.

Meanwhile, characteristics (packet size, delay time, occurrence frequency, and the like) of Internet packets having the same IP address are changed over time and the packets also have irregular and random characteristics. Therefore, a technology of detecting a network attack generally determines whether an attack occurs based on the number of received packets per unit time.

On the other hand, traffics generated in the in-vehicle network have different packet generation frequencies for each ID, but the traffics for each ID are relatively regularly generated. In this case, when two packets are generated simultaneously, a transmission sequence is determined based on priority.

Therefore, when packets having an ID are generated at high speed, an attack of injecting packets having a higher priority than that of the ID into a network with a frequency similar to the generation frequency of packets having the ID may not be detected only by an analysis based on the number of received packets per unit time.

That is, since IDs for attack having a higher priority are injected into a network instead of a normal ID having a lower priority, an attack may not be detected merely by a method of counting the number of packets.

Therefore, a need exists for a traffic analysis method suitable for vehicle traffics, that is different from a method used for Internet intrusion detection.

SUMMARY

Accordingly, the present inventive concept has been made to solve the above-mentioned problems occurring in the prior art while advantages achieved by the prior art are maintained intact.

One aspect of the present inventive concept relates to an apparatus and a method for detecting an in-vehicle network attack that cumulatively counts packets for each device (IDs) connected to an in-vehicle network bus, cumulates a check value S every time the packets are cumulatively counted to calculate a cumulated value, and determines that an attack is made when an average cumulated value obtained by dividing the cumulated value by cumulative counting does not exceed a first threshold value.

Another aspect of the present inventive concept encompasses an apparatus and a method for detecting an in-vehicle network attack that cumulatively counts packets for each device (IDs) included in a predetermined priority range among the devices (IDs) connected to an in-vehicle network bus, cumulates a check value S every time the packets are cumulatively counted to calculate a cumulated value, and determines that an attack occurs, when an average cumulated value obtained by dividing the cumulated value by cumulative counting does not exceed a third threshold value.

An aspect of the present inventive concept relates to an apparatus for detecting an in-vehicle network attack under the in-vehicle network environment in which devices having defined priorities for packet transmission are connected to an in-vehicle network bus. The apparatus includes: a packet collector configured to collect packets transferred via the in-vehicle network bus; a packet counter configured to cumulatively count the number of packets collected by the packet collector; a check value calculator configured to calculate a check value based on a generation time difference of packets having an identical ID; a cumulated value calculator configured to calculate a cumulated value by summing the check value calculated by the check value calculator and a check value just previously calculated; an average cumulated value calculator configured to calculate an average cumulated value by dividing the cumulated calculated by the cumulated value calculator by a value cumulatively counted by the packet counter; and an attack determinator configured to determine whether an attack occurs, based on the average cumulated value calculated by the average cumulated value calculator.

Another aspect of the present inventive concept encompasses a method for detecting an in-vehicle network attack under the in-vehicle network environment in which devices having defined priorities for packet transmission are connected to an in-vehicle network bus. According to the method, packets transferred via the in-vehicle network bus are collected by a packet collector. The number of collected packets is cumulatively counted by a packet counter. A check value is calculated by a check value calculator based on a generation time difference of packets having an identical ID. A cumulated value is calculate by a cumulated value calculator by summing the calculated check value and a check value just previously calculated. An average cumulated value is calculated by an average cumulated value calculator by dividing the calculated cumulated value by the cumulatively counted value. It is determined by an attack determinator, whether an attack occurs, based on the calculated average cumulated value.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION OF THE PREFERRED EMBODIMENTS

Figure 1:
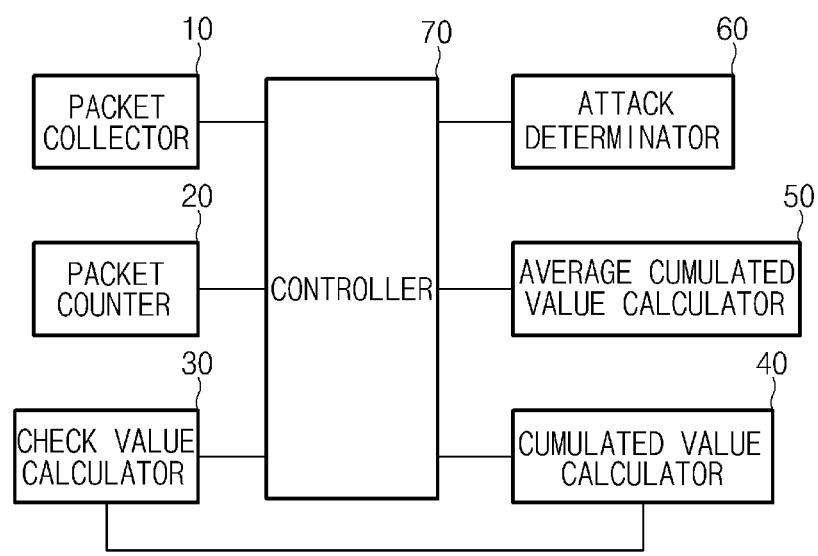
FIG. 1 is a configuration diagram of an apparatus for detecting an in-vehicle network attack according to an exemplary embodiment of the present inventive concept.

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

Hereinafter, exemplary embodiments of the present inventive concept will be described in detail with reference to the accompanying drawings.

FIG. 1 is a configuration diagram of an example of an apparatus for detecting an in-vehicle network attack according to an exemplary embodiment of the present inventive concept.

As illustrated in FIG. 1, an apparatus 100 for detecting an in-vehicle network attack according to an exemplary embodiment of the present inventive concept may include a packet collector 10, a packet counter 20, a check value calculator 30, a cumulated value calculator 40, an average cumulated value calculator 50, an attack determinator 60, and a controller 70.

Figure 2A:
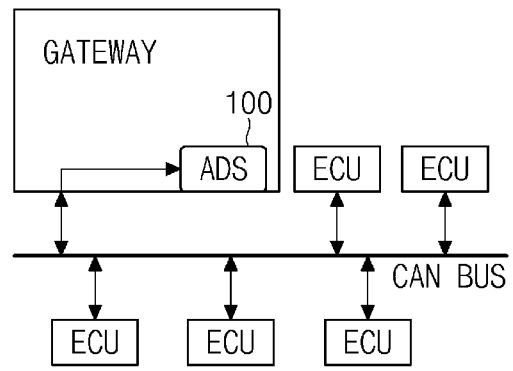
FIG. 2A is a diagram illustrating an example of an in-vehicle network bus to which the present inventive concept is applied.
Figure 2B:
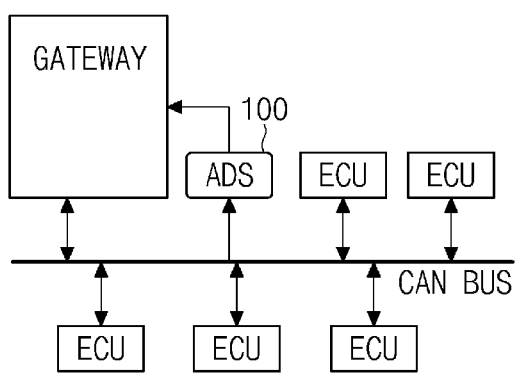
FIG. 2B is a diagram illustrating another example of an in-vehicle network bus to which the present inventive concept is applied.

The apparatus for detecting an in-vehicle network attack (ADS: Attack Detection system) including the above components may be implemented in a gateway of the in-vehicle network as illustrated in FIG. 2A. The ADS may also be implemented as a separate apparatus connected to an in-vehicle network bus as illustrated in FIG. 2B.

Describing each component, the packet collector 10 may first collect packets transferred via the in-vehicle network bus. In this case, each device (ECU: Electronic Control Units) connected to the in-vehicle network may be allocated with unique IDs and each device may transmit packets inserted with its own ID to the in-vehicle network.

Next, the packet counter 20 may cumulatively count the number of packets collected by the packet collector 10. That is, the packet counter 20 may classify the packets collected by the packet collector 10 into each ID, and then cumulatively count the number of packets for each ID.

In addition, the packet counter 20 may classify the packets collected by the packet collector 10 into each ID under the control of the controller 70, and then cumulatively count the packets of the IDs having a predetermined priority for each ID.

Next, the check value calculator 30 may generate a check value S based on a difference between a current time $t_c$ and a time $t_{ID}$ at which the packet of the corresponding ID has been just previously generated. That is, the check value calculator 30 calculates the check value S using the following Equation 1.

$$S = \log_2(t_c - t_{ID}) \qquad \text{[Equation 1]}$$

The check value calculator 30 may update the times at which packets are generated for each ID.

Next, the cumulated value calculator 40 may calculate a cumulated value $A = A + S$ by summing a check value calculated by the check value calculator 30 and a check value just previously calculated. Herein, A means the cumulated value.

Next, the average cumulated value calculator 50 may calculate an average cumulated value by dividing the cumulated value calculated by the cumulated value calculator 30 by a value (the number of cumulative packets of the corresponding ID) counted by the packet counter 20.

Next, the attack determinator 60 may determine that an attack occurs when the average cumulated value calculated by the average cumulated value calculator 50 does not exceed a threshold value.

Meanwhile, the controller 70 may control each component. In particular, the controller 70 may individually control each component according to a policy for detecting an in-vehicle network attack.

For example, when it is detected whether an attack is made against each of all the devices connected to the in-vehicle network bus, the controller 70 may perform a corresponding control function.

As another example, when it is detected whether an attack is made against each device included in a predetermined priority range, among the devices connected to the in-vehicle network bus, the controller 70 may perform a corresponding control function.

According to an exemplary embodiment of the present inventive concept, the cumulated value is cumulated by calculating a logarithm of a difference between a time when a packet having a specific ID has been just previously generated and a time when the packet is currently generated again.

In other words, the time difference between the generation of the packets of the same IDs is closely related with a probability value that a packet of the corresponding ID is generated. That is, an ID having a high generation frequency (an ID having a high generation probability) has a short time difference while an ID having a low generation frequency (an ID having a low generation probability) has a large time difference.

Since the ID having the high generation frequency has a short time difference, small values may be frequently added. On the other hand, since the ID having the low generation frequency has a large time difference, large values may be seldom added.

When these values are cumulated and then are divided by the number of total occurrences of packet generation of the corresponding ID, an average expected value (hereinafter, average cumulated value) can be obtained and it may be determined whether external attacks are made, based on the obtained average expected value.

Hereinafter, a principle of allowing the apparatus for detecting an in-vehicle network attack to detect external attacks against the in-vehicle network will be described with reference to FIG. 3.

Figure 3:
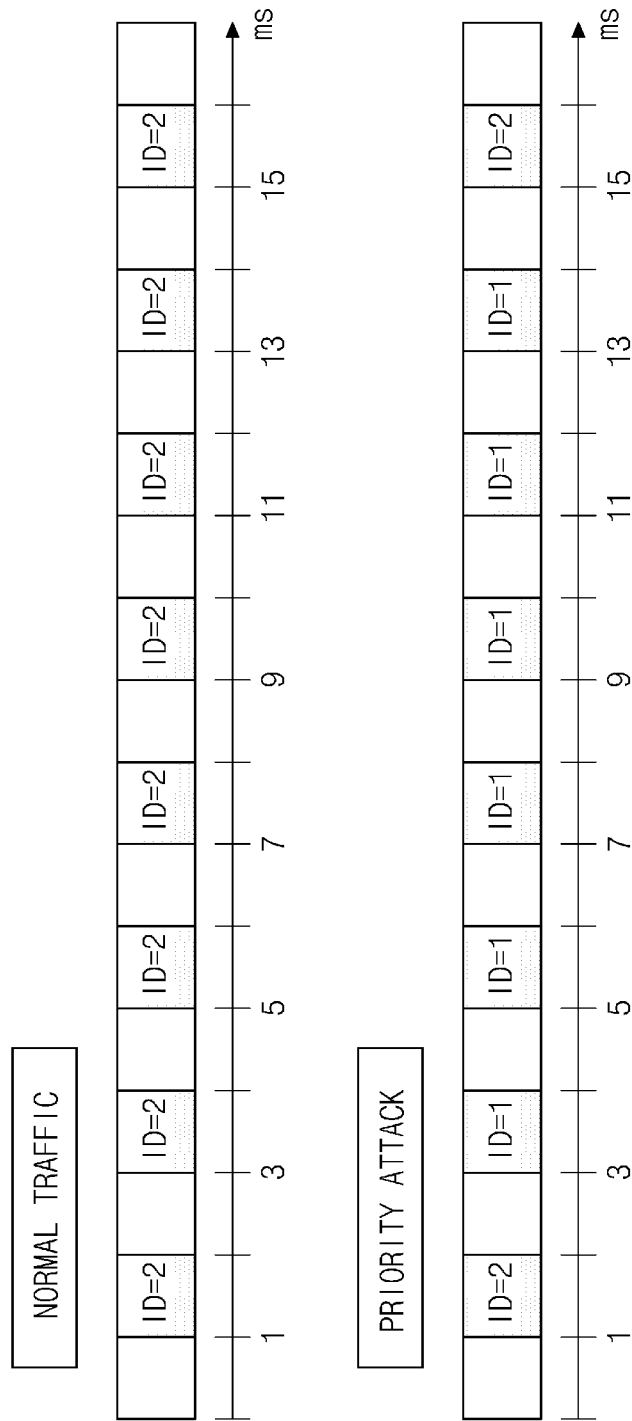
FIG. 3 is a diagram illustrating a principle for detecting an in-vehicle network attack according to another exemplary embodiment of the present inventive concept.

As illustrated in FIG. 3, as the normal traffic, it is assumed that a packet having ID=2 is generated every 2 ms. In this case, it is assumed that an external attacker, as a priority attack, injects a packet having ID=1 that has a higher priority than that of the packet having ID=2, corresponding to the generation period of the normal traffic to hinder the transmission of the normal packets having ID=2.

In this case, since the total number of all the packets is eight, it may not be understood whether an attack is made, when using only the conventional method of checking the number of packets.

However, an exemplary embodiment of the present inventive concept may generate the following difference in the cumulative average value to figure out whether the attacks are made against the in-vehicle network.

In the case of the normal traffic, the average cumulated value becomes $(\log_2 10^{-3} + 7 \times \log_2 2 \times 10^{-3})/8 = -9.09$.

On the other hand, in the case of the priority attack, the average cumulated value becomes $(\log_2 10^{-3} + \log_2 3 \times 10^{-3} + 5 \times \log_2 2 \times 10^{-3} + \log_2 14 \times 10^{-3})/8 = -8.67$.

Figure 4:
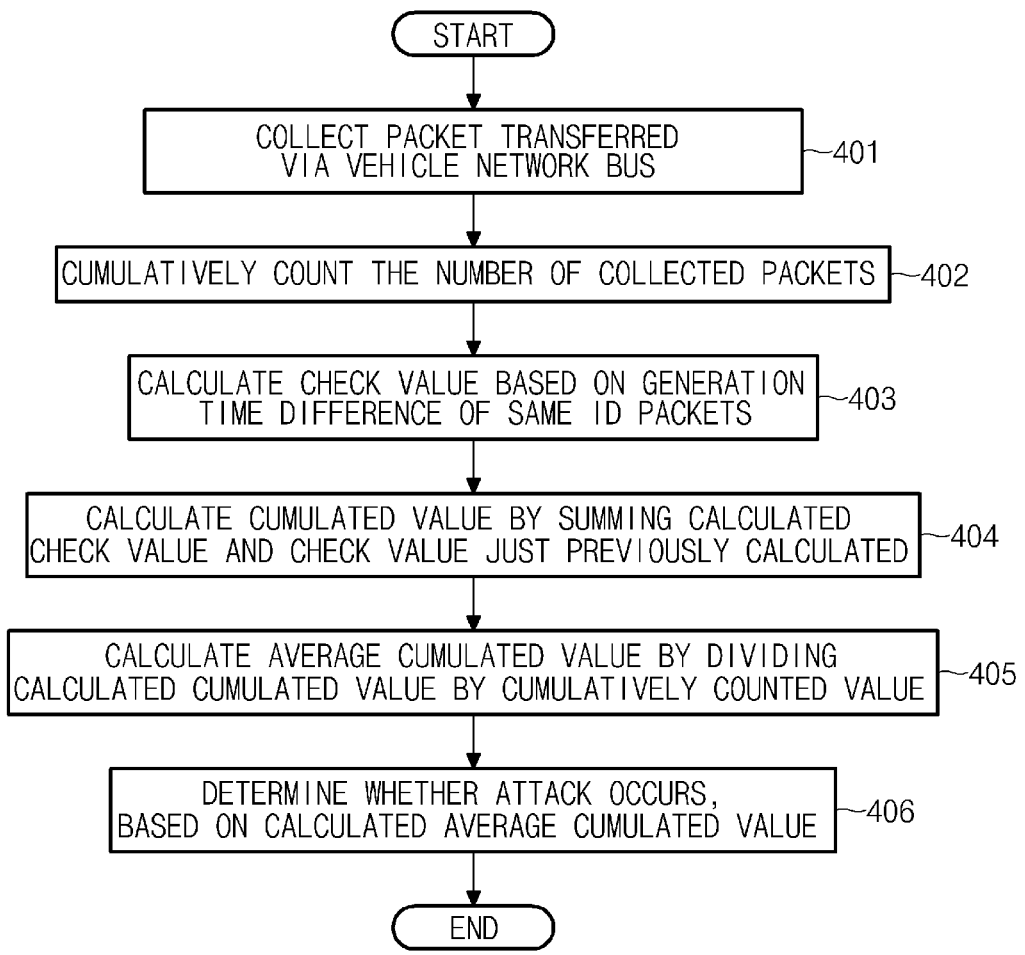
FIG. 4 is a flow chart of a method for detecting an in-vehicle network attack according to still another exemplary embodiment of the present inventive concept.

FIG. 4 is a flow chart of a method for detecting an in-vehicle network attack according to an exemplary embodiment of the present inventive concept.

First, the packet collector 10 may collect the packets transferred via the in-vehicle network bus (401).

Next, the packet counter 20 may cumulatively count the number of packets collected by the packet collector 10 (402). In this case, the packet counter 20 may classify the packets collected by the packet collector 10 into each ID and then cumulatively count the number of packets for each ID. The packet counter 20 may classify the packets collected by the packet collector 10 into each ID and then cumulatively count the packets of the IDs that have a predetermined priority for each ID.

Next, the check value calculator 30 may calculate a check value based on a generation time difference of the same ID packets (403).

Next, the cumulated value calculator 40 may calculate a cumulated value by summing the check value calculated by the check value calculator 30 and a check value just previously calculated (404).

Next, the average cumulated value calculator 50 may calculate an average cumulated value by dividing the cumulated value calculated by the cumulated value calculator 40 by a cumulatively counted value (405).

Next, the attack determinator 60 may determine whether any attacks occurs, based on the average cumulated value calculated by the average cumulated value calculator 50 (406).

The process may be performed once every time one packet is generated, that is, every time one packet is counted, so as to determine whether the attack is made against the in-vehicle network.

As set forth above, according to exemplary embodiments of the present inventive concept, attempts to hinder the normal operation of a vehicle due to a malfunction of a vehicle occurring on purpose can be blocked in advance by detecting the external attacks against the in-vehicle network bus ahead of time.

Further, according to exemplary embodiments of the present inventive concept, the in-vehicle communication load can be minimized by detecting external attacks without injecting additional data into the in-vehicle network bus.

In addition, according to exemplary embodiments of the present inventive concept, additional attack possibility can be blocked by detecting, ahead of time, an attempt to analyze the in-vehicle communication (e.g., an analysis attempt based on the injection of the random packets).

Although the present inventive concept was described with reference to limited exemplary embodiments and drawings, the present inventive concept is not limited thereto and may be changed and modified in various ways within the spirit of the present inventive concept and claims described below by those skilled in the art.

What is claimed is:

1. An apparatus for detecting an in-vehicle network attack under an in-vehicle network environment in which devices having defined priorities for packet transmission are connected to an in-vehicle network bus, the apparatus comprising:
    a packet collector configured to collect packets transferred via the in-vehicle network bus;
    a packet counter configured to cumulatively count the number of packets collected by the packet collector;
    a check value calculator configured to calculate a check value based on a generation time difference of packets having an identical ID;
    a cumulated value calculator configured to calculate a cumulated value by summing the check value calculated by the check value calculator and a check value just previously calculated;
    an average cumulated value calculator configured to calculate an average cumulated value by dividing the cumulated value calculated by the cumulated value calculator by a value cumulatively counted by the packet counter; and
    an attack determinator configured to determine whether an attack occurs based on the average cumulated value calculated by the average cumulated value calculator,
    wherein the check value calculator is configured to generate the check value based on a difference between a current time $t_c$ and a $t_{ID}$ at which a packet having the identical ID is just previously generated.

2. The apparatus according to claim 1, wherein the attack determinator is configured to determine that the attack occurs when the average cumulated value does not exceed a threshold value.

3. The apparatus according to claim 1, wherein the packet counter is configured to classify the packets collected by the packet collector into each ID and then cumulatively count the number of packets for each ID.

4. The apparatus according to claim 1, wherein the packet counter is configured to classify the packets collected by the packet collector into each ID and then cumulatively count the packets of the IDs having a predetermined priority for each ID.

5. The apparatus according to claim 1, wherein the check value calculator is configured to calculate a check value S using the following [Equation A]:

$$S = \log_2(t_c - t_{ID}). \qquad \text{[Equation A]}$$

6. A method for detecting an in-vehicle network attack under an in-vehicle network environment in which devices having defined priorities for packet transmission are connected to an in-vehicle network bus, the method comprising:
    collecting, by a packet collector, packets transferred via the in-vehicle network bus;
    cumulatively counting, by a packet counter, the number of collected packets;
    calculating, by a check value calculator, a check value based on a generation time difference of packets having an identical ID;
    calculating, by a cumulated value calculator, a cumulated value by summing the calculated check value and a check value just previously calculated;
    calculating, by an average cumulated value calculator, an average cumulated value by dividing the calculated cumulated value by a cumulatively counted value; and determining, by an attack determinator, whether an attack occurs, based on the calculated average cumulated value, wherein in the calculating of the check value, the check value is generated based on a difference between a current time $t_c$ and a $t_{ID}$ at which a packet having the identical ID is just previously generated.

7. The method according to claim 6, wherein in the determining of whether the attack occurs, it is determined that the attack occurs, when the average cumulated value does not exceed a threshold value.

8. The method according to claim 6, wherein in the counting of the packets, the packets collected by the packet collector are classified into each ID and then the number of packets is cumulatively counted for each ID.

9. The method according to claim 6, wherein in the counting of the packets, the packets collected by the packet collector are classified into each ID and then packets having IDs that have a predetermined priority are cumulatively counted for each ID.

10. The method according to claim 6, wherein in the calculating of the check value, a check value S is calculated using the following [Equation B]:

$$S = \log_2(t_c - t_{ID}). \qquad \text{[Equation B]}$$

\* \* \* \* \*